United States Patent
Schroeder et al.

(10) Patent No.: US 6,538,429 B2
(45) Date of Patent: Mar. 25, 2003

(54) ANGULAR POSITION SENSOR ASSEMBLY FOR A MOTOR VEHICLE GENERATOR SHAFT

(75) Inventors: Thaddeus Schroeder, Rochester Hills, MI (US); Jose Alberto Guerra, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/780,301

(22) Filed: Feb. 9, 2001

(65) Prior Publication Data

US 2002/0109500 A1 Aug. 15, 2002

(51) Int. Cl.⁷ .............................. G01B 7/30; G01D 5/14; H02K 11/00
(52) U.S. Cl. .............................. 324/207.2; 324/207.22; 324/207.25; 310/68 B
(58) Field of Search .............................. 324/173, 174, 324/207.2, 207.21, 207.22, 207.25; 73/514.39; 310/68 B; 123/406.58, 617

(56) References Cited

U.S. PATENT DOCUMENTS

| | | | |
|---|---|---|---|
| 4,283,679 A | * | 8/1981 | Ito et al. ............. 324/207.21 X |
| 4,642,496 A | * | 2/1987 | Kerviel et al. ........ 324/207.2 X |
| 4,745,363 A | | 5/1988 | Carr et al. .................. 324/208 |
| 4,904,936 A | * | 2/1990 | Richmond .................. 324/174 |
| 5,477,143 A | | 12/1995 | Wu ........................ 324/207.21 |
| 6,100,682 A | | 8/2000 | Schroeder ............. 324/207.21 |
| 6,133,729 A | | 10/2000 | Mierzwinski ............... 324/174 |
| 6,271,663 B1 | * | 8/2001 | Kanbe et al. .......... 324/207.21 |

FOREIGN PATENT DOCUMENTS

JP  08054205  2/1996

OTHER PUBLICATIONS

Wehmer, B.F., "Electromagnetic Tachometer", IBM Tech. Discl. Bull. vol. 11, No. 7, Dec. 1968.*

* cited by examiner

*Primary Examiner*—Gerard R. Strecker
(74) *Attorney, Agent, or Firm*—Margaret A. Dobrowitsky

(57) ABSTRACT

An angular position sensor assembly for a vehicle generator shaft includes one magnet and three magnetic field sensors placed within a housing. The sensors are disposed on a circuit board that is parallel to the end of a generator shaft. The sensors are configured so that signals from the sensors are out-of-phase by predetermined angles. The generator shaft alternatingly forms plural slots and plural teeth. As the shaft rotates, the slots and teeth cause a change in a magnetic field around each sensor. By sensing the changes in the magnetic field, the position of the shaft can be determined from the out of phase signals received from the sensors.

22 Claims, 2 Drawing Sheets

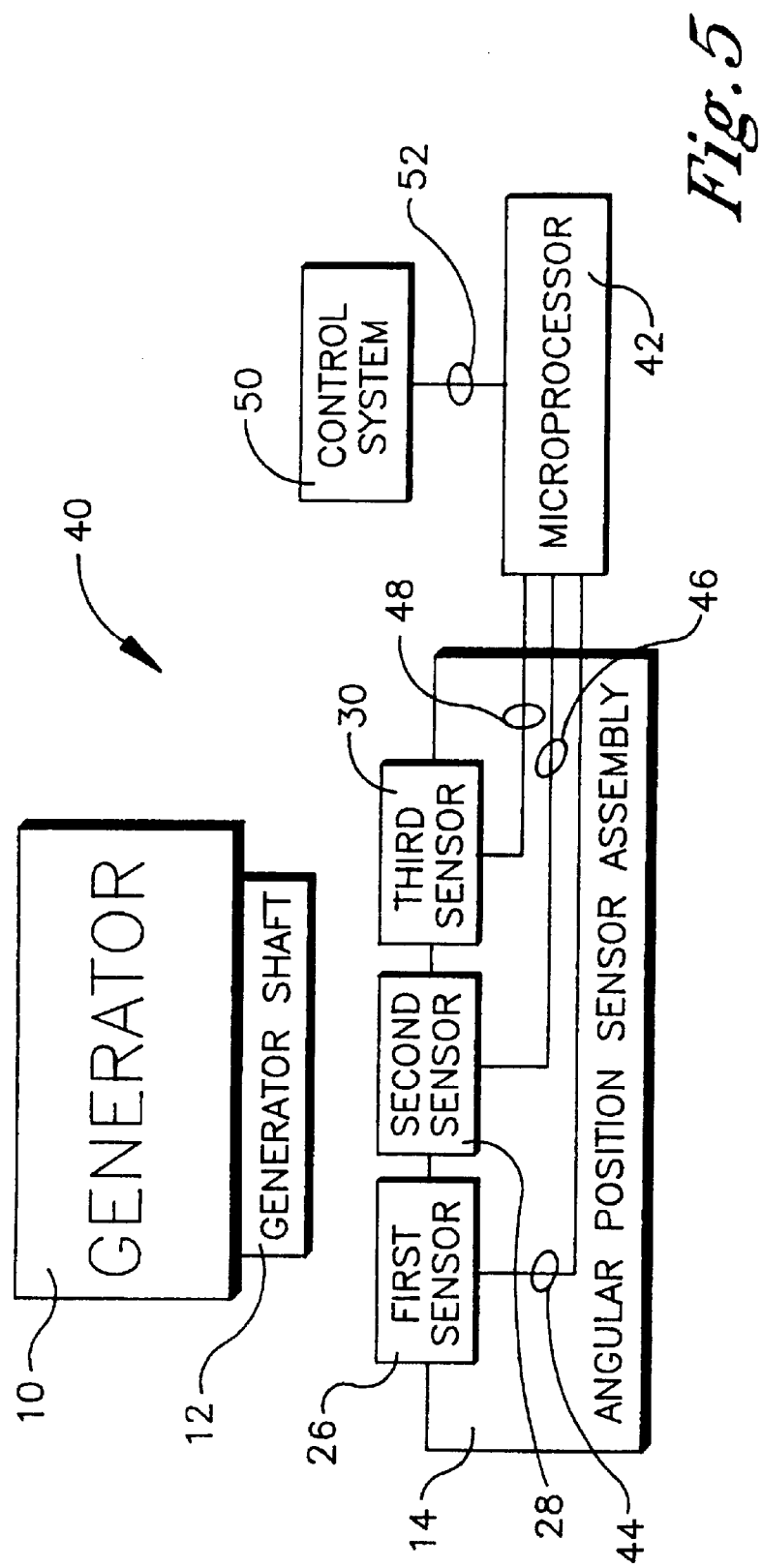

ANGULAR POSITION SENSOR ASSEMBLY FOR A MOTOR VEHICLE GENERATOR SHAFT

TECHNICAL FIELD

The present invention relates generally to angular position sensors.

BACKGROUND OF THE INVENTION

Electrical generators (also referred to as "alternators") are standard equipment on motor vehicles. In a typical motor vehicle, a generator is mechanically coupled to an engine crank shaft, e.g., by a first pulley mounted on the crank shaft, a second pulley mounted on a shaft within the rotor of the generator, and a belt disposed around both pulleys. As the crank shaft rotates, the generator rotates and creates current which is used to power the electric components within the vehicle.

The present invention recognizes that it is sometimes necessary to know the angular position of the generator shaft. It happens that the angular position can be determined using a sensor assembly that includes multiple magnets that are precisely affixed to the end of the generator shaft and multiple magnetic field sensors placed in proximity to the magnets. Accordingly, the position of the magnets and, hence, the position of the generator shaft, can be determined. Unfortunately, the need for multiple magnets and the precision in which they must be installed on the shaft, increases the cost of the sensor assembly.

As such, the present invention has recognized these prior art drawbacks, and has provided the below-disclosed solutions to one or more of the prior art deficiencies.

SUMMARY OF THE INVENTION

An angular position sensor assembly for a motor vehicle generator shaft includes a housing and one magnet placed within the housing. Plural magnetic field sensors are disposed within the housing such that they are within a magnetic field created by the magnet. The sensors are placed near the end of a generator shaft that is alternatingly formed with plural slots and plural teeth. Accordingly, the sensors sense changes in the magnet field caused by the slots and teeth as they pass by the sensors.

In a preferred embodiment, the end of the shaft is formed with six slots and six teeth. Moreover, the slots and teeth are equally sized and shaped and equally spaced around the outer periphery of the end of the shaft. Preferably, the sensors are disposed on a circuit board that is placed parallel to the end of the shaft. In a preferred embodiment, the plural sensors include a first sensor that is disposed on the circuit board, a second sensor that is disposed on the circuit board so that it is one hundred and forty degrees from the first sensor, and a third sensor that is disposed on the circuit board so that it is one hundred and forty degrees from the second sensor. As such, an electrical signal from the second sensor is twenty degrees out of phase with an electrical signal from the first sensor and an electrical signal from the third sensor is twenty degrees out of phase with the electrical signal from the second sensor. A microprocessor is connected to the sensors and receives signals from the sensors that represent the angular position of the generator shaft. Preferably, the sensors are Hall effect sensors.

In another aspect of the present invention, a motor vehicle system includes a generator that has a rotating shaft. The shaft includes an end that is alternatingly formed with plural slots and plural teeth. An angular position sensor assembly is affixed to the generator in proximity to an end of the shaft. The sensor assembly includes a housing that has one magnet and plural magnetic field sensors placed therein. In this aspect of the present invention, the sensors are placed within the housing such that they are proximal to the end of the shaft. Accordingly, the sensors sense changes in a magnet field caused by the slots and teeth as they pass by the sensors when the shaft rotates. A microprocessor is connected to the sensors and receives signals from the sensors that representing the angular position of the generator shaft.

In yet another aspect of the present invention, an angular position sensor assembly includes a target wheel that is alternatingly formed with plural slots and teeth. The sensor assembly also includes one magnet and a first, second, and third magnetic field sensor placed in the same plane. The sensors are placed between the magnet and the target wheel. Moreover, the sensors are configured so that a signal from the second sensor is out of phase with a signal from the first sensor and a signal from a third sensor is out of phase with the signals from the first and second sensors.

The present invention will now be described, by way of example, with reference to the accompanying drawings, in which:

BRIEF DESCRIPTION OF THE DRAWINGS

FIG. 5 is a block diagram of a system in which the angular position sensing assembly can be incorporated.

DESCRIPTION OF AN EMBODIMENT OF THE INVENTION

Figure 1:
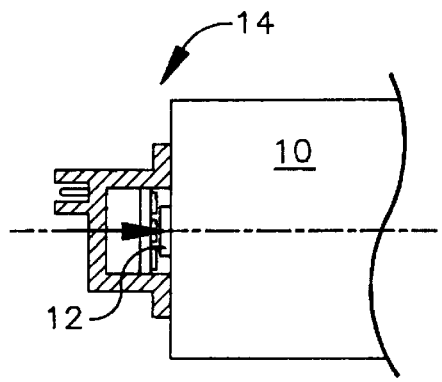
FIG. 1 is a plan view of an angular position sensing assembly affixed to the end of a generator with the sensing assembly housing cut away for clarity.

Referring initially to FIG. 1, a vehicle generator is shown and generally designated 10. FIG. 1 shows that the generator 10 includes a rotating shaft 12. As shown in FIG. 1, an angular position sensor assembly, generally designated 14, is attached to the end of the generator 10 such that a circuit board within the sensor assembly 14, described below, is in close proximity to the end of the generator shaft 12.

Figure 2:
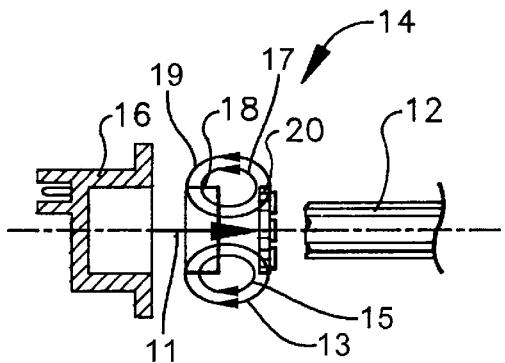
FIG. 2 is an exploded view of the angular position sensing assembly.

Referring to FIG. 2, the sensor assembly 14 includes a preferably plastic housing 16. Fixedly disposed within the housing 16 is a preferably, disk-shaped permanent magnet 18 and a printed circuit board 20. When the sensor assembly 14 is assembled and installed on the end of the generator 10, the printed circuit board 20 is between the end of the generator shaft 12 and the magnet 18. Moreover, the printed circuit board 20 is parallel to the end of the shaft 12. It is to be understood that the polarity of magnet 18 is oriented such that it is perpendicular to the printed circuit board 20, as shown by arrow 11. Also, the magnetic field is distributed with respect to the printed circuit board 20 and the end of the 12 as shown by ellipses 13, 15, 17, and 19.

Figure 3:
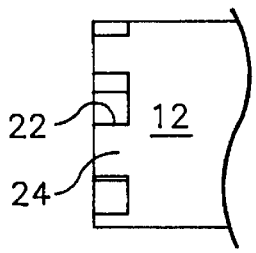
FIG. 3 is a side plan view of the generator shaft.
Figure 3A:
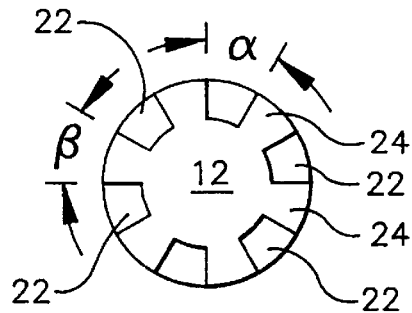
FIG. 3a is an end view of the generator shaft.

FIGS. 3 and 3a show the details of the generator shaft 12. As shown in FIGS. 3 and 3a, the end of the generator shaft 12 is formed with plural, preferably six, slots 22. The slots 22 are identical in size and are equally spaced around the outer periphery of the end of the shaft 12. FIG. 3a shows that each slot 22 spans an arc having an angle, α. In the presently preferred embodiment, the angle, α, is thirty degrees 30°. As such, when the preferably six slots 22 are machined or otherwise cut in the end of the shaft 12, six teeth 24 are formed in the end of the shaft 12. As shown, each tooth 24 spans an arc having an angle, β. The angle, β, is also thirty degrees 30°. It is to be understood that the end of the shaft 12 acts as a target wheel for the sensor assembly 14.

Figure 4:
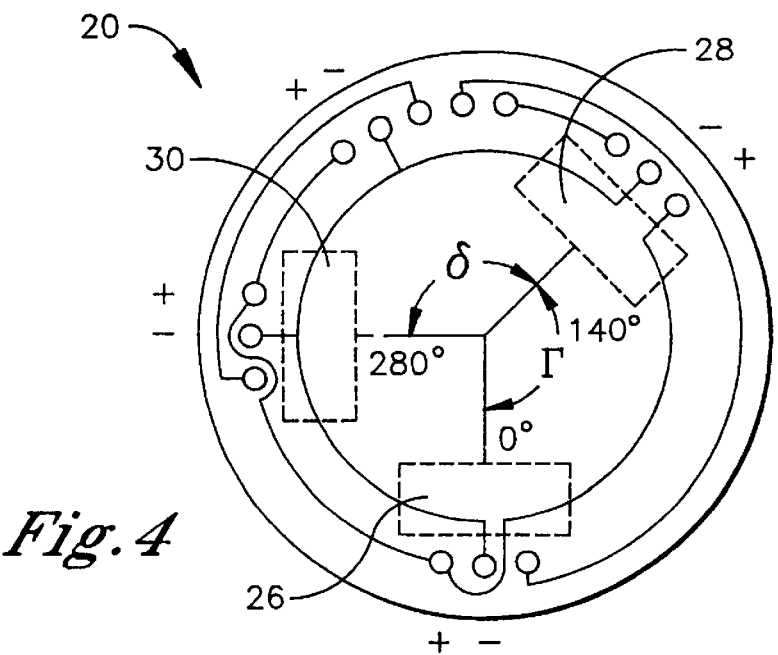
FIG. 4 is a plan view of a printed circuit board.

Referring to FIG. 4, details regarding the printed circuit board 20 can be seen. FIG. 4 shows that the printed circuit board 20 includes a first magnetic field sensor 26, a second magnetic field sensor 28, and a third magnetic field sensor 30 disposed thereon. In a preferred embodiment, the magnetic field sensors 26, 28, 30 are Hall effect sensors, but it is to be appreciated that other magnetic effect sensors can be used. As shown, the first sensor 26 and the second sensor 28 are placed at an angle, Γ, with each other. Moreover, the third sensor 30 is placed at an angle, δ, with the second sensor 28. Preferably, the angles, Γ and δ, are one hundred and forty degrees (140°). Thus, in the preferred embodiment, the first sensor 26 and the third sensor 30 are at an angle of eighty degrees (80°) from each other.

FIG. 5 shows a system, generally designated 40, in which the presently preferred sensor assembly 14 can be incorporated. As shown in FIG. 5, the system 40 includes the generator 10, described above, and the angular position sensor assembly 14, also described above. FIG. 5 shows that the angular position sensor assembly 14 is placed so the sensors 26, 28, 30 are slightly spaced from the generator shaft 12. The system 40 also includes a microprocessor 42 that is connected to the sensors 26, 28, 30 by electric lines 44, 46, 48, respectively. Moreover, a control system 50 is connected to the microprocessor 42 by electric line 52.

As the generator shaft 12 rotates, the slots 22 and teeth 24 alternatingly pass by each sensor 26, 28, 30 and alter the magnetic field around each sensor 26, 28, 30. Thus, each sensor 26, 28, 30 generates six signal pulses per revolution. Each pulse represents a change in the magnetic field caused by the transition from slot 22 to tooth 24 in the immediate vicinity of each sensor 26, 28, 30. It is to be understood that the angular configuration of the sensors 26, 28, 30 on the printed circuit board 20, cause the signals from the sensors 26, 28, 30 to be electrically out of phase with each other by twenty degrees (20°). Accordingly, the signal from the first sensor 26 will be twenty degrees (20°) out of phase with the signal from the second sensor 28 and the signal from the second sensor 28 will be twenty degrees (20°) out of phase with the signal from the third sensor 30. The microprocessor 42 uses these out of phase signals from the sensors 26, 28, 30 to determine the angular position of the generator shaft 12.

With the configuration of structure and logic described above, it is to be appreciated that the angular position sensor assembly for a vehicle generator shaft can be used to determine the angular position of a rotating shaft within a vehicle generator.

While the particular ANGULAR POSITION SENSOR ASSEMBLY FOR A VEHICLE GENERATOR SHAFT as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "lone or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. An angular position sensor assembly for a motor vehicle generator shaft, comprising:

a housing;

one and only one magnet placed within the housing;

a generator shaft having an end, the end of the shaft being alternatingly formed with plural slots and plural teeth the end of the shaft extending at least partially into the housing; and plural magnetic field sensors disposed within the housing within a magnetic field created by the magnet and proximal to the end of the shaft, the sensors sensing changes in the magnetic field caused by the slots and teeth alternatingly passing by the sensors.

2. The assembly of claim 1, wherein the end of the shaft is formed with six slots and six teeth.

3. The assembly of claim 1, wherein the slots and teeth are equally sized and shaped and equally spaced around the outer periphery of the end of the shaft.

4. The assembly of claim 1, wherein the sensors are disposed on a circuit board, the circuit board being placed so that it is parallel to the end of the shaft.

5. The assembly of claim 4, wherein the plural sensors comprise:

a first sensor disposed on the circuit board;

a second sensor disposed on the circuit board so that it is one hundred and forty degrees from the first sensor; and a third sensor disposed on the circuit board so that it is one hundred and forty degrees from the second sensor.

6. The assembly of claim 5, wherein an electrical signal from the second sensor is twenty degrees out of phase with an electrical signal from the first sensor and an electrical signal from the third sensor is twenty degrees out of phase with the electrical signal from the second sensor.

7. The assembly of claim 1, further comprising:

a microprocessor connected to the sensors, the microprocessor receiving signals from the sensors representing the angular position of the generator shaft.

8. The assembly of claim 1, wherein the sensors are Hall effect sensors.

9. A motor vehicle system, comprising:

a generator having rotating shaft therein, the shaft including an end alternatingly formed with plural slots and plural teeth;

an angular position sensor assembly, the sensor assembly having a housing affixed to the generator in proximity to an end of the shaft, one and only one magnet placed within the housing, plural magnetic field sensors disposed within the housing proximal to the end of the shaft, the sensors sensing changes in a magnetic field caused by the slots and teeth alternatingly passing by the sensors; and a microprocessor connected to the sensors, the microprocessor receiving signals from the sensors representing the angular position of the generator shaft.

10. The system of claim 9, wherein sensor assembly includes one and only one magnet.

11. The system of claim 9, wherein the end of the shaft is formed with six slots and six teeth.

12. The system of claim 9, wherein the slots and teeth are equally sized and shaped and equally spaced around the outer periphery of the end of the shaft.

13. The system of claim 9, wherein the sensors are disposed on a circuit board, the circuit board being placed so that it is parallel to the end of the shaft.

14. The system of claim 13, wherein the plural sensors comprise:

a first sensor disposed on the circuit board;

a second sensor disposed on the circuit board so that it is one hundred and forty degrees from the first sensor; and a third sensor disposed on the circuit board so that it is one hundred and forty degrees from the second sensor.

15. The system of claim 14, wherein an electrical signal from the second sensor is twenty degrees out of phase with an electrical signal from the first sensor and an electrical signal from the third sensor is twenty degrees out of phase with the electrical signal from the second sensor.

16. The system of claim 9, wherein the sensors are Hall effect sensors.

17. An angular position sensor assembly, comprising:

a target wheel formed by an end of a rotating shaft alternatingly formed with plural slots and teeth;

one and only one magnet;

a first magnetic field sensor;

a second magnetic field sensor in the same plane as the first magnetic field sensor; and a third magnetic field sensor disposed in the same plane as the first and second sensors, the sensors being placed between the magnet and the end of the rotating shaft and configured so that a signal from the second sensor is out of phase with a signal from the first sensor and a signal from a third sensor is out of phase with the signals from the first and second sensors, the signals from the sensors being generated as the target wheel rotates and the slots and teeth move past the sensors.

18. The assembly of claim 17, wherein the rotating shaft is a shaft within a vehicle generator.

19. The assembly of claim 17, wherein the target wheel is formed with six slots and six teeth.

20. The assembly of claim 17, wherein the slots and teeth are equally sized and shaped and equally spaced around the outer periphery of the end of the shaft.

21. The assembly of claim 17, wherein the sensors are disposed on a circuit board, the circuit board being placed so that it is parallel to the end of the shaft, the second sensor being placed one hundred and forty degrees from the first sensor, and the third sensor being placed one hundred and forty degrees from the second sensor.

22. The assembly of claim 17, wherein the sensors are Hall effect sensors.

* * * * *